Figure 1:
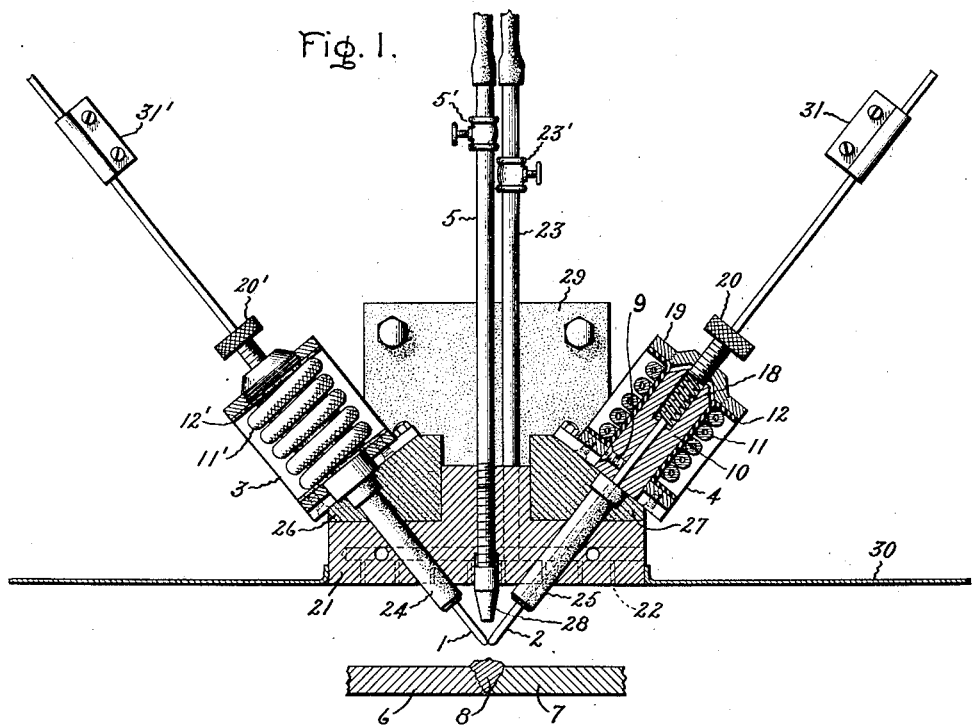

June 27, 1933.   R. PALMER   1,916,014
WELDING PROCESS
Original Filed July 30, 1924

Inventor:
Robert Palmer,
by *Alexander S. Lamb*
His Attorney.

Patented June 27, 1933

1,916,014

UNITED STATES PATENT OFFICE

ROBERT PALMER, OF NISKAYUNA, NEW YORK, ASSIGNOR TO GENERAL ELECTRIC COMPANY, A CORPORATION OF NEW YORK

WELDING PROCESS

Application filed July 30, 1924, Serial No. 729,188. Renewed August 14, 1930.

The present invention comprises a new method for joining metal members to each other by fusion either of adjoining portions of the members to be united or by the fusion of another distinct metal body acting as a binder to unite the members to be welded.

In the practice of electric arc welding, an arc usually is struck between the work to be welded and an electrode which may consist of carbon or of a fusible metal. In the former case only the work is melted, and in the latter case the electrode is melted, with or without local fusion of the work, the molten metal forming part of the weld. In either case the weld is constituted by metal of variable composition and variable structure, which even under the most favorable circumstances contains a substantial proportion of oxides and nitrides and which in the case of ferrous metal fused by an arc operated between one or more carbon electrodes contains so much carbon as to approximate white iron in its composition and having spots too hard to be machinable. Even when a metal electrode is used in making the weld, the metal deposited by the arc ordinarily is of inferior quality due to impurities obtained from the air, and it will usually break when given a bend through an angle of about 45°.

Dr. Irving Langmuir has demonstrated that ordinary hydrogen, which is a di-atomic gas $H_2$, is dissociated at high temperatures such as prevailing in an arc, forming a new variety of hydrogen, which has been called "atomic hydrogen", a change which is accompanied by the absorption of large amounts of energy, analogous to the conversion of heat to the latent state by the fusion of a solid or the vaporization of a liquid. The heat thus rendered latent by the dissociation of the hydrogen is freed by the reassociation of the atomic hydrogen. This fact has been utilized by Dr. Langmuir for a method of delivering heat from a high temperature source, such as an arc or incandescent body, to a body which is to be heated. For example, in accordance with the invention of Dr. Langmuir, as described in a copending application Serial No. 729,185 filed concurrently herewith and assigned to the same assignee as the present application, the above broad principle has been utilized in heating apparatus wherein atomic hydrogen dissociated by an electric arc is permitted to recombine in contact with a part to be heated to which it gives up its latent heat.

In accordance with my invention the welding of metals is carried out by means of atomic hydrogen.

The welding of metals by fusion in the presence of atomic hydrogen is attended by new and unforeseen advantages. The metal fused in atomic hydrogen is devoid of oxides, nitrides, carbides, or other impurities which formerly were an inevitable accompaniment of fusion-welded metal. I have found that the metal is homogeneous in structure, and is so malleable and pliable that welds made in accordance with my invention can be readily deformed or bent upon themselves.

In accordance with one of the features of my invention, metals of the chromium class which are highly oxidizable, and are not reducible by ordinary hydrogen from their oxides, may be welded or introduced into welds without oxidation or other detrimental contamination.

Other new properties of welds made in accordance with my invention will be explained hereinafter.

As the term "welding" has been generally employed heretofore to designate the binding of metal parts by fusion with an electric arc or blow-pipe flame, I will use the same term for the process constituting my invention, in other words using the term welding in the broad sense to designate the binding or joining of metal parts by fused metal.

Figure 3:
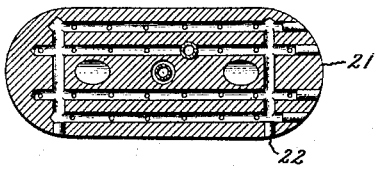
Figure 2:
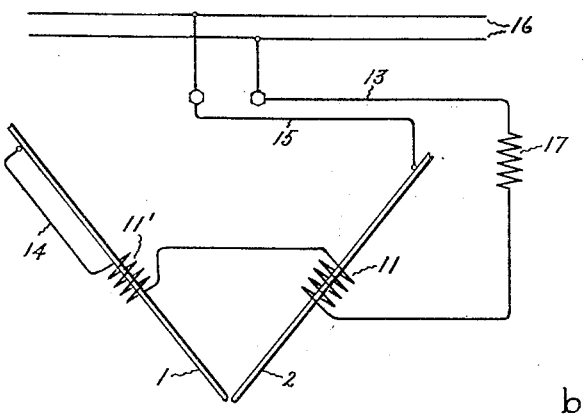

Apparatus suitable for practising my invention is illustrated by the accompanying drawing in which Fig. 1 is a view partly in section thereof; Fig. 2 is a diagram of electric connections, and Fig. 3 is a sectional view of part of the welding apparatus shown in Fig. 1.

Referring to the drawing, the dissociation source of heat is represented in a preferred apparatus by an arc which is operated between the electrodes 1, 2, consisting of suitable conducting material, preferably tungsten, which is capable of sustaining an arc in hydrogen with so little accompanying disintegration or consumption as to be substantially non-consuming during use. These electrodes are held and fed into operating relation by holders 3, 4 which in this case are shown as being adapted for automatic control but which may be hand-operated if desired. The electrodes are shown as being held at an angle of about 75° to each other, but they may be held in line with each other, horizontally with respect to the work or may be otherwise disposed. A localized blast or stream of hydrogen supplied by a tube 5 is directed transversely through the arc against the work which is illustrated as comprising a pair of plates 6 and 7 united by the fused metal 8. The blast of hydrogen may be controlled by a valve 5' in the tube 5. Since the electrodes are practically non-consuming and the metal of the electrodes is not deposited upon the work or incorporated in the weld, it is necessary, where added metal is desired to make the joint, to supply such metal either from a rod fed to the point of welding or placed along the joint to be welded. For certain classes of work the contiguous edges of the work to be welded may be merely fused down to make the joint without the addition of filler metal. Welding along the line of the joint to be welded may be effected by any suitable means, examples of which are well known, arranged to move the work with respect to the welding head carrying the electrodes or to move the welding head along the work, the work being stationary. The welding head may also be arranged so as to be readily portable for manual operation.

The electrodes 1, 2 may consist of tungsten rods ¼ inch in diameter, their size being governed by the current desired for the work in hand. The electrodes may be secured by any suitable clamping means. As illustrated in Fig. 1, in section, the clamping means may be a simple set screw 9 securing the electrode 2 to one of the cores 10.

The respective cores 10 may be magnetically controlled by the windings 11, 11' which are wound upon flanged, cylindrical supports 12, 12' consisting of suitable insulating material, such as lava, and as shown in Fig. 2 these windings are connected in series with the electrodes 1, 2 by the conductors 13, 14 and 15 to a source of current, represented here by the supply lines 16. A stabilizing resistor or reactor for this circuit is indicated at 17. As thus arranged, the electrodes are initially in contact and upon the flow of current the magnetic cores are lifted and an arc is struck. As shown in section in Fig. 1, the core 10 can be lifted within the coil 11, thereby compressing the spring 18 between the core 10 and the cap 19. The tension on the springs may be regulated by thumb screws 20, 20'. By this means a predetermined arc length may be maintained for a given current. The spring tension may, however, be adjusted so that the electrodes are fully retracted whenever current is flowing, the coils being used merely to strike the arc automatically at the beginning of welding and restrike it automatically in the event that it fails.

Above the arcing tips of the electrodes is provided a metal plate or cover 21 having a number of ducts 22, whereby a supply of hydrogen is furnished to bathe the arc and the work with hydrogen which is delivered by a conduit 23 provided with a valve 23'. The electrodes 1, 2 are insulated from the plate 21 by the lava bushings 24, 25. The holders 3, 4 are attached to the insulating blocks 26, 27 which are in turn mounted upon the plate 21. The nozzle 28 for the hydrogen supply tube 5 preferably consists of a refractory metal. In an actual apparatus molybdenum which is a highly refractory metal readily machinable has been used. The described parts may be mounted upon a bracket 29 consisting of a suitable insulating composition, such as a molded composition containing silica, lime and asbestos. A shield 30 preferably is provided to prevent undue heating of the apparatus or discomfort to the operator. Electric terminals 31, 31' are provided for connecting the supply circuit to the electrodes.

In making a weld, the atomic hydrogen is produced by the introduction of energy into the hydrogen in the arc stream between the electrodes. A localized blast of hydrogen, which preferably has been dried, is directed across the arc and upon the work. The velocity of the blast causes the atomic hydrogen to be directed to the object to be welded. A localized stream of atomic hydrogen is thus obtained and directed onto the work. At this point the atomic hydrogen is reconverted to molecular hydrogen giving up to the work in the form of heat the energy which was required to dissociate the hydrogen. The proportion of the blast of hydrogen which is dissociated to atomic hydrogen is dependent upon the energy delivery to the arc. An excess of molecular hydrogen is not detrimental. The rate at which the work is heated is dependent almost entirely upon the energy in the arc, being substantially independent of the rate at which hydrogen is supplied as long as there is a sufficient supply of hydrogen to absorb the energy of the arc by the dissociation of the hydrogen. The rate of heating the work is, therefore, controlled by controlling the electrical energy supplied to the arc. The amount of energy required is determined by the character of the work being done and the amount of hydrogen, as heretofore indicated, must be sufficient to transfer the energy of the arc to the work. Atmospheric air should be excluded from the arc and the area of the work under fusion. For this purpose I at present deem it preferable to deliver a bathing atmosphere of hydrogen as, for example, through the perforations in the plate 21, but successful results may be secured merely by using an excess of hydrogen from the blast, it being merely essential that there be an atmosphere of hydrogen circumambient the arc and in contact with the work to displace and exclude atmospheric air or other deleterious gases and vapors.

Either direct or alternating current may be used to supply the arc. A relatively high voltage is required to maintain the arc between electrodes in the hydrogen atmosphere. I have used arcs with a separation between the electrode tips of from ⅛ in. to ½ in. Greater distances may be used. The arc voltage, when using alternating current with a separation between the electrode tips of about ¼ in., is about 300 volts with 40 amperes in the arc. Higher voltages and different current values may be used. The length and voltage of the arc existing between the electrode tips is dependent upon the velocity of the hydrogen blast since this blows the arc into a generally semicircular form. A greater velocity of the blast produces a longer arc length and requires a higher impressed voltage to maintain the same current through the arc. With a separation of the electrodes of from ⅛ in. to ½ in., I have used a distance of about one inch between the electrode tips and the work.

The hydrogen in its atomic state is an active reducing agent and remover of carbon, sulphur and phosphorus contained in the iron or other metal being welded. The intense heat of the atomic hydrogen torch causes both the metal introduced into the weld as indicated at 8, Fig. 1, and also the metal of the adjoining edges of the parts 6, 7 of the work to be completely fused and to be thoroughly united, thereby forming a sound, homogeneous union.

The metal of the weld is malleable, and without cavities, or laminations in structure. It can be forged cold and can be readily machined. The metal fused by the atomic hydrogen torch is so soft and malleable that the welded parts can be bent at the weld through an angle of 180° without rupturing the metal. On account of this chemical refinement of the metal by atomic hydrogen, the fused metal in the weld is less subject to corrosion than the material from which the weld was made.

In order further to reduce the oxidation and to improve the corrosion-resisting properties of welded parts under severe conditions, such as encountered in boilers and furnaces, metallic chromium, nickel, aluminum, copper or other corrosion-resisting metal may be incorporated into the metal constituting the weld. These metals may be introduced either as alloys, or in their unalloyed state between the bodies to be welded. Parts consisting of chromium steel, for example, can be readily fused together by a stream of atomic hydrogen and metallic chromium may be fused and caused to alloy with steel. The resulting weld is tough and strong. Under the atomic hydrogen torch chromium will fuse and flow freely, whereas chromium oxide is not reducible in ordinary molecular hydrogen and if fused in ordinary hydrogen will not flow freely because of the external skin of oxide.

Of course, chromium may not only be introduced into parts of ferrous metal, or the like to improve the quality and strength of the weld, but parts consisting of highly oxidizable metals may be welded in the presence of atomic hydrogen.

In ordinary arc welding the electrodes consume relatively rapidly and a relatively sensitive regulation is required of the rate of feeding of the electrodes to compensate for their consumption and maintain the arc length substantially constant. Since in apparatus for practicing my method the refractory metal electrodes do not wear away except very slowly in the hydrogen atmosphere, the problem of sensitively regulating the rate of electrode feed is practically non-existent. Since there is no variation of the arc length due to consumption of the electrodes, the length of the arc and the energy in the arc remain substantially constant for any given adjustment of the apparatus and the supply circuit. The heating of the work may, therefore, be very accurately controlled. Losses from radiation are reduced and electrical energy of the arc is efficiently carried from the arc to the work and there utilized at the exact point where fusion is desired. The energy in the arc may be adjusted through a wide range of values and sufficient energy may be developed in the arc and utilized in the work to weld along the line of the joint at speeds of many feet per minute in relatively heavy work.

The latent heat of dissociated hydrogen is so great that the energy of the arc may be carried to the work with but a moderate amount of hydrogen. The excess hydrogen for producing the required bathing atmosphere is also not great. I have successfully welded in the open air using a total amount of hydrogen of from fifteen to twenty-five cubic feet per hour. The operation is, therefore, not only advantageous from the standpoint of the improved metallurgical properties of the weld and the close adjustment of the heating to the work required, but is economical in the use of hydrogen and economical as far as time and labor are concerned since sufficient energy may be effectively utilized to enable welds to be made at very high speeds.

What I claim as new and desire to secure by Letters Patent of the United States, is:

1. The method of welding metals which includes the steps of generating a substantial amount of atomic hydrogen and causing local fusion at the parts to be welded by and in the presence of said atomic hydrogen and substantially no oxygen.

2. The method of welding which consists in directing a blast of atomic hydrogen upon adjoining parts to be united and controlling the rate of delivery of said atomic hydrogen to unite said parts by fusion while excluding atmospheric air from said parts.

3. The method of welding oxidizable metals which includes the steps of generating a substantial amount of atomic hydrogen and uniting adjoining regions of the parts to be welded by fusion with and in the presence of said atomic hydrogen while excluding deleterious gases and vapors.

4. The method of welding metals which includes the steps of generating a substantial amount of atomic hydrogen and uniting adjoining regions of the parts to be welded by fusion with and in the presence of said atomic hydrogen while maintaining a flow of hydrogen over the area under fusion to exclude deleterious gases and vapors.

5. The method of uniting metal parts by a binder metal forming an oxide reducible with difficulty which includes the steps of fusing said binder metal in contact with said parts with and in the presence of atomic hydrogen and substantially no oxygen.

6. The method of uniting metal parts with a binder metal containing a corrosion-resisting metal in substantial amounts which includes the step of fusing said binder metal with and in the presence of atomic hydrogen and substantially no oxygen.

7. The method of uniting ferrous metal members with a ferrous alloy of chromium which consists in producing fusion of said alloy and regions of said members adjoining the desired union by a blast of atomic hydrogen while maintaining a flow of hydrogen circumambient the arc to exclude air from the area being fused.

8. The method of producing refined, homogeneous welds by arc welding apparatus of the type where an arc is maintained from a substantially non-consuming electrode and wherein the arc is arranged to be traversed along the line of the joint to be welded, which comprises subjecting the parts to be welded to the fusing action of the arc in conjunction with substantial amounts of atomic hydrogen and excluding air from the said parts by maintaining a flow of hydrogen circumambient the arc and said parts.

9. The method of fusion welding in the open air by means of welding apparatus comprising a pair of electrodes between which an arc is maintained adjacent the work to be welded, which consists in directing a localized blast of hydrogen through the arc upon the work, said blast being dissociated to atomic hydrogen by heat imparted from the arc, while maintaining a flow of hydrogen circumambient the arc to exclude air from the area being fused.

10. The method of arc welding in the open air which comprises maintaining an arc and supplying traversely through said arc against the molten portions of the work to be welded a stream of gaseous medium comprising hydrogen while excluding atmospheric air from the arc and area of the work under fusion.

11. The method of welding in the open air which comprises maintaining an arc, subjecting said arc and the molten portions of the work to be welded to a stream of gaseous medium comprising a reducing gas dissociable in the arc to its atomic state and utilizing the heat released by the recombination of said atomic gas to fuse the work while excluding atmospheric air from the arc and the area of the work under fusion.

12. The method of fusing and alloying with a metal a second metal forming an oxide reducible with difficulty which includes the step of fusing said second metal and the adjacent portions of said first metal with and in the presence of atomic hydrogen and substantially no oxygen.

13. The method of fusing and alloying to another metal metals which are highly oxidizable and are not readily reducible by ordinary hydrogen from their oxides which comprises the steps of fusing said metals and causing them to flow over the other metal with and in the presence of atomic hydrogen and substantially no oxygen.

14. The method of fusing and alloying chromium with steel which comprises fusing said chromium in contact with said steel with and in the presence of atomic hydrogen and substantially no oxygen.

In witness whereof, I have hereunto set my hand this 29th day of July 1924.

ROBERT PALMER.